United States Patent [19]
Fleischmann

[11] Patent Number: 6,118,230
[45] Date of Patent: *Sep. 12, 2000

[54] LIGHTING CONTROL SYSTEM INCLUDING SERVER FOR RECEIVING AND PROCESSING LIGHTING CONTROL REQUESTS

[75] Inventor: Marc Werner Fleischmann, Menlo Park, Calif.

[73] Assignee: Hewlett-Packard Company, Palo Alto, Calif.

[*] Notice: This patent is subject to a terminal disclaimer.

[21] Appl. No.: 09/016,206

[22] Filed: Jan. 30, 1998

[51] Int. Cl.$^7$ ..................................................... H05B 37/00
[52] U.S. Cl. .......................... 315/312; 315/294; 315/316
[58] Field of Search ................................... 315/291, 294, 315/312, 316

[56] References Cited

U.S. PATENT DOCUMENTS 4,213,182  7/1980  Eichelberger et al. ................. 364/493
4,947,302  8/1990  Callahan ................................ 362/233
5,059,871  10/1991 Pearlman et al. ...................... 315/316
5,769,527  6/1998  Taylor et al. ............................ 362/85

Primary Examiner—David Vu

[57] ABSTRACT

A lighting control system includes a server that is instructed by a lighting daemon to receive lighting control requests on a computer network and respond to the lighting control requests. Each lighting control request identifies a lighting load (directly or indirectly) and a lighting load state (e.g., full intensity) for the identified lighting load. When the server receives a lighting control request over the network, it is instructed to generate proprietary commands for an interface module, which controls the identified lighting load according to the lighting load state. Thus, the server allows lighting loads to be controlled by any Network Appliances connected to a computer network. Network Appliances can include web browsers, Virtual Light Switches and smart sensors.

36 Claims, 8 Drawing Sheets

| Hdr | IP Addr | Intensity | ID |

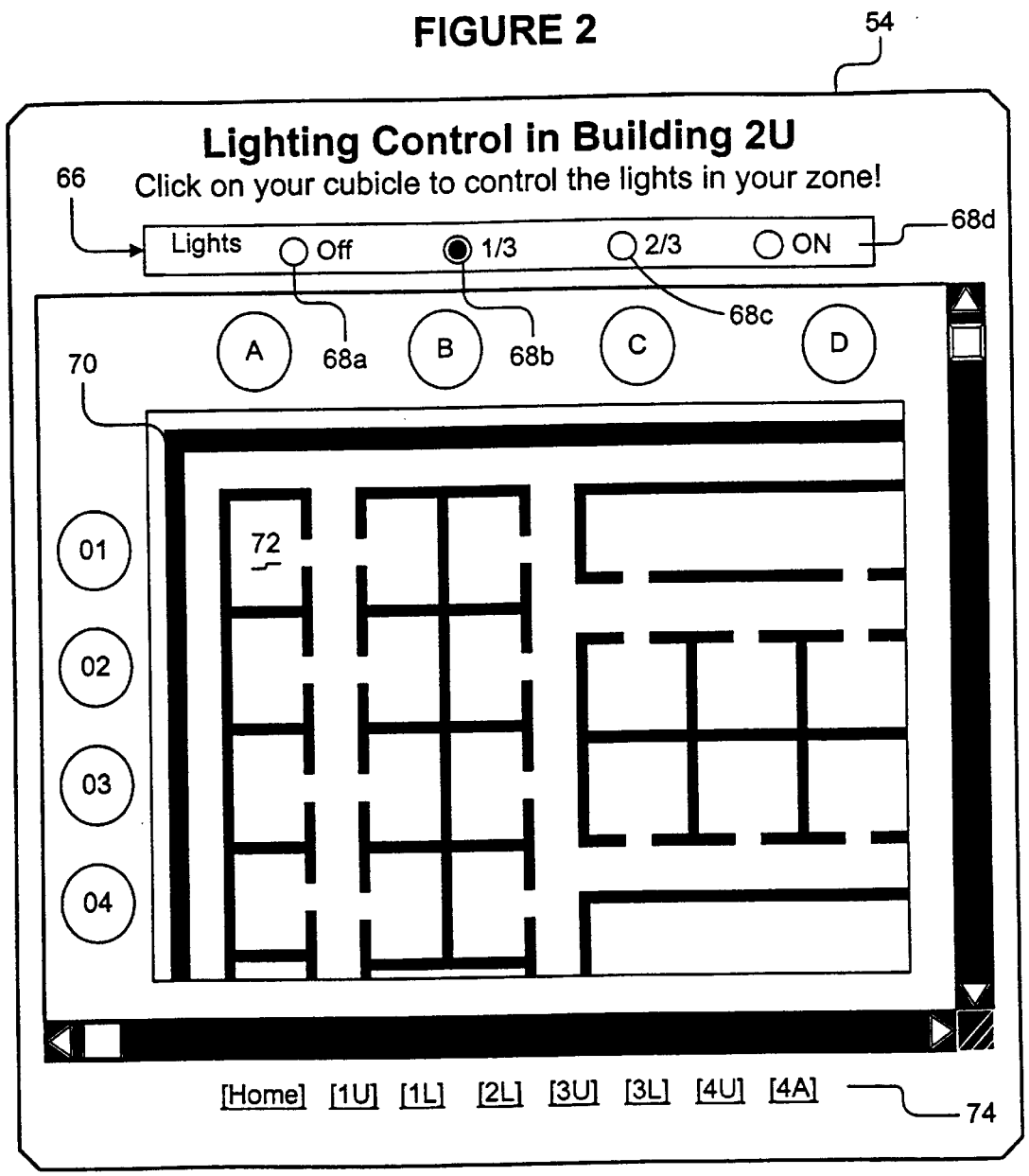

LIGHTING CONTROL SYSTEM INCLUDING SERVER FOR RECEIVING AND PROCESSING LIGHTING CONTROL REQUESTS

BACKGROUND OF THE INVENTION

The present invention relates generally to lighting control systems. More specifically, the present invention relates to a computer-based system for controlling power to multiple ac lighting loads.

Lighting loads in a large office building are typically controlled from a central location by a computer programmed with proprietary software. The computer can be programmed to turn on all office lighting loads before the start of business and turn off all of the office lighting loads after business hours. In addition to scheduling the times at which the lighting loads are turned on and off, the computer can also be programmed to perform annunciation of load status, central monitoring and reporting to ensure that the building is operating as efficiently as planned.

The computer typically interfaces with a plurality of transformer relays, which are located in junction boxes throughout the building. The computer can control each relay to apply or remove power from its associated lighting load and thereby turn its associated lighting load on or off. A lighting load can include a single light or multiple lights. The relays and, therefore, the lighting loads can also be controlled by wall-mounted switches and sensors distributed throughout the building. Such a system including a plurality of intelligent relay-based lighting control system is available from the General Electric Company under the names "Total Lighting Control" system and "TLC" systems.

However, controlling the lighting loads from a central location can cause problems for those people who come to work early or work late into the night. When the computer turns off the lights, some of the people inside the building will be left in the dark. Naturally, they will want to turn the lights back on. However, turning the lights back on can pose more than a mild inconvenience. A person must set aside his work, walk over to the light switch and flip on the switch. In a large work area having many different lights, finding the correct switch can be a challenge. Some lighting control systems do not even allow the lights to be manually overridden.

Instead, a facilities management is called and asked to turn the lights on. Hopefully the response will be prompt.

There are phone-based lighting control systems that allow a person to turn on the lights by dialing up a certain number. These phone-based systems map each available lighting load onto a corresponding phone number. However, such artificial phone number mappings are non-intuitive. For instance, a person might be required to memorize or look up a twelve-digit phone number in order to use the phone-based lighting control system. For this reason alone, the phone-based systems tend to be cumbersome to use. Additionally, typical phone-based lighting control systems do not allow the intensities of the lighting loads to be varied.

SUMMARY OF THE INVENTION

The present invention can be regarded as a lighting control system that allows a person to use a computer network to control one or more lighting loads. Such control can be performed conveniently and quickly. The lighting control system includes a computer having memory encoded with executable instructions. When executed, the executable instructions instruct the computer to receive lighting control requests on the computer network and respond to the lighting control requests by generating lighting control commands. The lighting control requests indicate states (e.g., lighting load intensities) for the lighting loads. The lighting control system further includes means (e.g., an interface module, power/communications bus and relays) for controlling at least one lighting load in response to the lighting control commands.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 2 is an illustration of an image map and a lighting control form, which are displayed by the web browser;

DETAILED DESCRIPTION OF THE INVENTION

Figure 1:
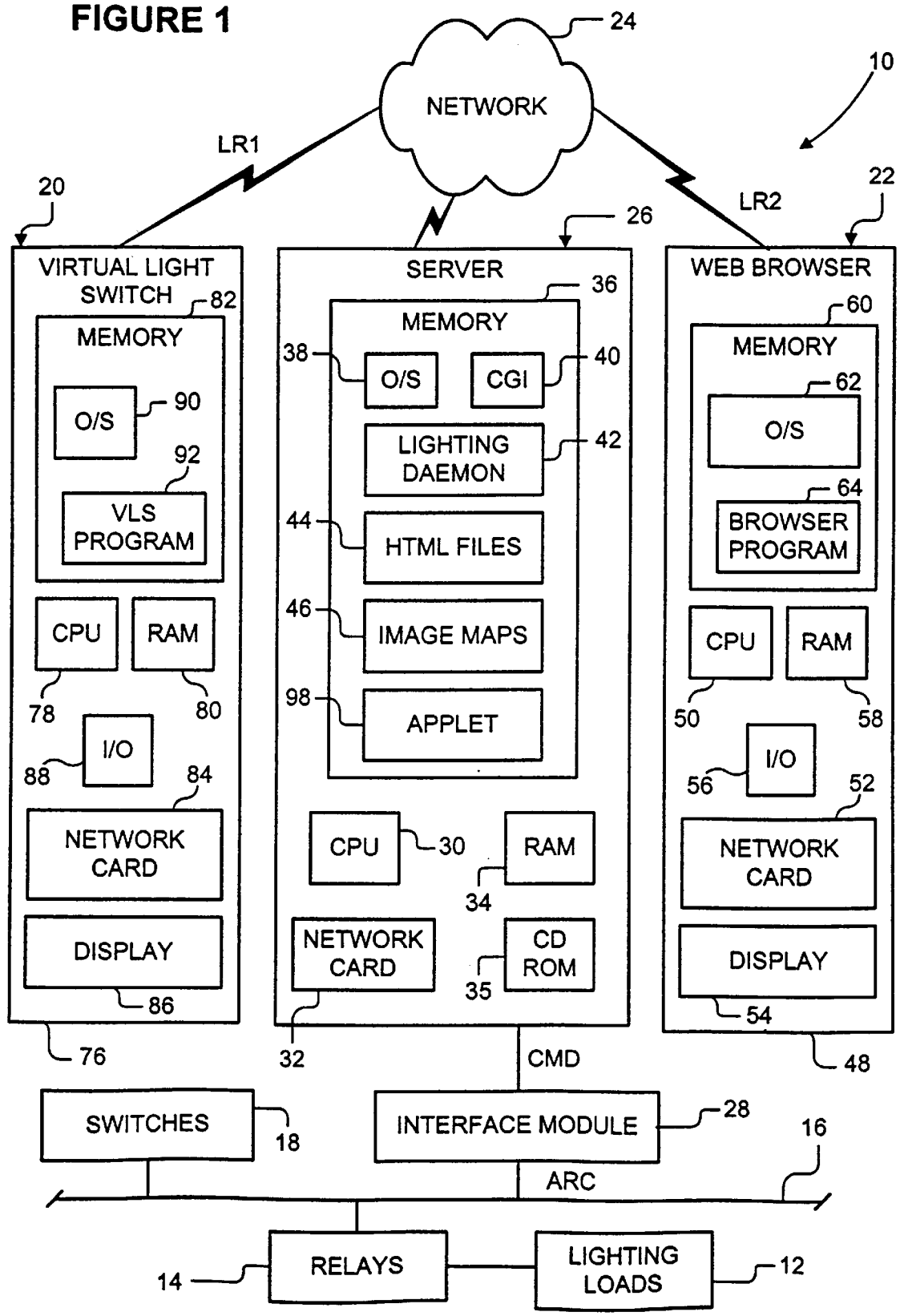
FIG. 1 is a schematic diagram of a lighting control system including a server, a web browser and a Virtual Light Switch.

As shown in the drawings for purposes of illustration, the invention is embodied in a lighting control system. The lighting control system allows distributed elements or Network Appliances connected to a computer network to control a plurality of lighting loads. Thus, a person can quickly turn lights on and off from the convenience of his or her desk. Moreover, the Network Appliances can include computers already connected to the network. Thus, the lighting control system can be expanded by using existing hardware. As a result, the lighting control system can be set up and expanded quickly and inexpensively.

FIG. 1 shows a lighting control system 10 for a plurality of lighting loads 12. The lighting loads 12 can be located in a facility such as an office building. A typical office building has multiple floors and lighting loads 12 on each floor. There might be one or more lighting loads 12 per office, or there might be one lighting load 12 covering several offices. The lighting loads 12 are turned on and off by relays 14, which are wired to a power/communications bus 16. The relays 14 are controlled by wall-mounted switches 18 and other devices such as daylight sensors and occupancy sensors located in the offices and at various locations in the building. Turning on a switch 18 causes a relay 14 to turn on an associated lighting load 12.

The relays 14 are also controlled by Network Appliances such as a Virtual Light Switch 20 and a web browser 22 connectable to a computer network 24. Typically, there would be more than one Virtual Light Switch 20 and more than one web browser 22. To simplify the description of the present invention, however, the lighting control system 10 will be described in connection with only one Virtual Light Switch 20 and only one web browser 22. The Virtual Light Switch 20 and the web browser 22 generate first and second lighting control requests LR1 and LR2, which identify states (e.g., lighting intensities) of specific lighting loads. The first and second lighting control requests LR1 and LR2 are sent over the computer network 24 to a server 26. The server 26, which might or might not be located in the same building as the lighting loads 12, receives the first and second lighting control requests LR1 and LR2 and responds by generating digital commands CMD. The digital commands CMD, which indicate the lighting load states indicated in the lighting control requests LR1 and LR2, are used to control the lighting loads 12.

The digital commands CMD are sent to an interface module 28. The interface module 28 allows the server 26 to link into the power/communications bus 16. Typically, the interface module 28 does not adhere to an open standard; instead, it expects the digital commands CMD to be in a proprietary format. Therefore, the server 26 generates the digital commands CMD in the proprietary format. The interface module 28 translates the digital commands CMD into analog relay commands ARC and places the analog relay commands ARC onto the power/communications bus 16. The analog relay commands ARC are received by all of the relays 14 coupled to the power/communications bus 16, but they control only specific relays 14. Thus, the analog relay commands ARC can control a specific relay 14 to turn on its associated lighting load 12, adjust brightness of its lighting load 12, etc. The interface module 28 also receives status signals on the power/communications bus 16. The status signals are placed on the power/communications bus 16 when, for instance, a light switch 18 is flipped on or off. Such relays 14, power/communication buses 16 and interface modules 28 are commonly used in lighting control systems. For example, the interface module 28 can be a TLC Dataline Communications Interface Module, which is available from GE Lighting Controls.

Figures 1A, 3:
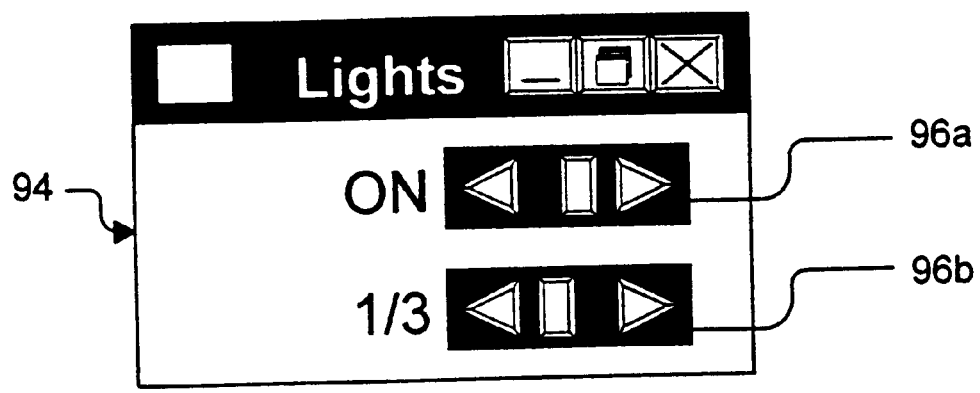
FIG. 1a illustrates a format for a first lighting control request.
FIG. 3 is an illustration of a control panel, which is displayed by the Virtual Light Switch.

The first lighting control request LR1 directly identifies a specific lighting load 12 and a state (e.g., lighting load intensity) for the identified lighting load 12. An exemplary first lighting load request LR1 including header information, a bit field for an ID number and a bit field for a lighting load intensity (e.g., 0=off, 1=⅓ intensity) is illustrated in FIG. 1a. The first lighting control requests LR1 are generated by Network Appliances such as the Virtual Light Switch 20. The second lighting control request LR2 identifies a lighting load state and indirectly identifies a specific lighting load 12 by providing information about the lighting load 12. The information is later translated in order to directly identify the specific lighting load 12. As discussed below, the second lighting control requests LR2 are generated by Network Appliances such as the web browser 22.

The computer network 24 can be anything from the Internet to a local area network ("LAN") using proprietary client-server software. The physical and link layers of the computer network 24 can be Ethernet, Token Ring or any other physical and link layer. The network layer can be Internet Protocol ("IP") or any other network protocol. The transport layer can be Transport Control Protocol ("TCP"), User Datagram Protocol ("UDP"), or any other transport protocol. The session layer can be Hypertext Transport Protocol ("HTTP"), File Transfer Protocol ("FTP"), "DCOM," "CORBA" or any other session protocol. Merely by way of example, the computer network 24 will be described as a LAN having an Ethernet backbone, and using TCP/IP and HTTP communication protocols.

The server 26 includes a central processing unit 30, a network card 32 for communicating over the computer network 24, RAM 34, and a memory storage device memory (e.g., a hard drive) 36 encoded with data. The data includes an operating system 38, interface program 40, a lighting daemon 42, multiple HTML files 44, and multiple image maps 46. Each HTML file 44 and image map 46 corresponds to a floor plan of the facility. The data can be loaded onto the memory storage device 36 via a peripheral device 35 such as a CD ROM drive, electronically transferred to the memory storage device 36 via the computer network 24, etc.

Each HTML file 44 includes a set of tags (i.e., instructions) for the web browser 22. The web browser 22 can be a first personal computer 48 including a central processing unit 50 and a network card 52 for communicating over the computer network 24. The first personal computer 48 further includes a display 54, I/O devices 56 such as a mouse and keyboard, RAM 58 and a hard drive 60 encoded with an operating system 62 and web browser program 64 such as "Netscape Navigator" or "Microsoft Internet Explorer."

Additional reference is now made to FIG. 2. After the web browser 22 downloads an HTML file 44 from the server 26, the web browser 22 stores the HTML file 44 in the RAM 58 or the hard drive 60 and begins executing the tags in the HTML file 44. The tags instruct the web browser 22 to download and display the image map 46 corresponding to the downloaded HTML file 44 and to create and display a lighting control form 66. The lighting control form 66 includes graphical display elements 68a, 68b, 68c and 68d such as radio buttons and checkboxes indicating pre-selected lighting states such as lighting intensities. FIG. 2 happens to show a first radio button 68a corresponding to an "off" state, second and third radio buttons 68b and 68c corresponding to "⅓ intensity" and "⅔ intensity" and a fourth radio button corresponding to "full intensity." Using an I/O device 56 such as a mouse, a lighting load state is selected by clicking a graphical display element 68a, 68b, 68c or 68d. The lighting control form 66 could also include a text box (not shown) for entering a numerical value (or percentage) of lighting intensity.

The downloaded image map 46 graphically shows selectable representations of the lighting loads 12. For example, the image map 46 shows a floor plan 70 for the office building. When a first zone 72 on the floor plan 70 is clicked, the HTML file 44 instructs the web browser 22 to generate a second lighting control request LR2 identifying the lighting load state selected on the lighting control form 66 and information about (e.g., coordinates of) the first zone 72. The HTML file 44 also instructs the web browser 22 to send the second lighting control request LR2 to the interface program 40 running on the server 26. A second lighting control request LR2 according to the HTTP protocol might include a GET command, the URL of the interface program 40 and a query string including the zone coordinates and the lighting load state.

The interface program 40 can be a Common Gateway Interface (CGI) program, which listens on a server port for the second lighting control requests LR2 from the web browser 22. When a second lighting control request LR2 is received, the interface program 40 identifies the lighting load 12 covering the first zone 72. The interface program 40 can use a lookup table to translate the zone coordinates into a lighting load identifier (e.g., a lighting load ID number). The interface program 40 can also perform access control to determine whether the web browser 22 making the second lighting control request LR2 is authorized to control the identified lighting load 12.

The interface program 40 sends a first lighting control request LR1 indicating the lighting load identifier and the lighting load state to the lighting daemon 42. In response, the lighting daemon 42 generates a digital command CMD for the interface module 28. The digital command CMD indicates the identified lighting load and lighting load state, but in a format expected by the interface control module 28. The interface module 28, in response, translates the digital command CMD into an analog control signal ARC, which causes a relay 14 to turn on the identified light at the intensity indicated in the digital command CMD.

Thus, clicking the second radio button 68b on the lighting control form 66 and then clicking a first zone 72 of the floor plan 70 will cause the lighting load 12 covering the first zone 72 to be turned on to ⅓ intensity. Clicking the first radio button 68a of the lighting control form 66 and clicking the first zone 72 again will cause the lighting load 12 covering the first zone 72 to be turned off.

The HTML file 44 could also generate a navigation bar 74 for linking to other floor plans. For example, clicking floor plan 1U on the navigation bar 74 would cause an HTML file 44 and image map 46 corresponding to floor plan 1U to be downloaded to the web browser 22.

The lighting daemon 42 also makes network connections with the Virtual Light Switch 20 and listens on the server port for first lighting control requests LR1 directly from the Virtual Light Switch 20. The Virtual Light Switch 20 controls an assigned lighting load 12. The Virtual Light Switch 20 can be a second personal computer 76 including a central processing unit 78, RAM 80, a disk drive 82, and a network card 84 for communicating over the computer network 24. The second personal computer 76 further includes a display 86 and I/O devices 88 such as a mouse and keyboard. A windows-based operating system 90 and VLS program 92 are stored on the disk drive 82. Unlike the web browser 22, which receives its instructions from the server 26, the Virtual Light Switch 20 receives its instructions from the VLS program 92. If coded in the "Java" programming language, the VLS program 92 can be run on different platforms. When the instructions of the VLS program 92 are executed, the Virtual Light Switch 20 displays an icon (not shown) on the display 86. The icon represents the lighting load 12 that is controlled by the Virtual Light Switch 20. The icon can indicate the current state of the assigned lighting load 12. For example, an icon that is only half lit might indicate a light intensity of 50%.

When the icon is selected (for example, by positioning a cursor over the icon and clicking), a control panel 94 appears on the display 86 (see FIG. 3). The control panel 94 includes graphical display elements 96a and 96b such as radio buttons, sliders and scrollbars for entering lighting intensities and other lighting states. Controlling a graphical display element 96a or 96b causes the Virtual Light Switch 20 to generate and send first lighting control requests LR1 over the network 24 in real time. Thus, the Virtual Light Switch 20 controls its assigned lighting load 12 in real-time.

The first lighting control request LR1 from the Virtual Light Switch 20 directly identifies its assigned lighting load 12 and a state (e.g., light intensity) for the assigned lighting load 12. The Virtual Light Switch 20 can be preconfigured with the identifier for its assigned lighting load 12. The Virtual Light Switch 20 can be configured manually by accessing an identifier from a configuration file on the server 26 and saving the identifier on the disk drive 82. In the alternative, the Virtual Light Switch 20 could automatically receive a lighting identifier from the server 26 upon connection. The server 26 could use a CGI script for generating the lighting load identifier.

The lighting daemon 42 receives the first lighting control request LR1 on the network 24 and processes the first lighting control request LR1 by generating a digital command CMD for the interface module 28. The digital command CMD indicates the identified lighting load and lighting load state, but in the format expected by the interface control module 28.

As previously mentioned, the Virtual Light Switch 20 can also display the status of its assigned lighting load 12. To enable each Virtual Light Switch 20 to display the status of its assigned lighting load 12, the lighting daemon 42 communicates with the interface module 28 and monitors the power/communications bus 16 for analog relay commands ARC. When a wall-mounted switch 18 is flipped, for example, an analog relay command ARC is placed on the power/communications bus 16 and sent to a relay 14 associated with the wall-mounted switch 18. Via the interface module 28, the lighting daemon 42 detects the analog relay command ARC, generates a message including a lighting load identifier and the state of the light switch 18 affected by the analog relay command ACR, and multicasts the message to the Virtual Light Switch 20. Because the Virtual Light Switch 20 is configured with a matching identifier, it updates its icon for the change in state of the assigned lighting load 12.

For example, if the second personal computer 76 is located in a second zone, it might be configured to function as a Virtual Light Switch 20 for the lighting load 12 covering the second zone. The icon displayed on the display 78 of the second personal computer 76 would indicate the intensity of the lighting load 12 covering the second zone. Sliding a slider bar on the control panel 94 would cause the Virtual Light Switch 20 to generate and send first lighting control requests LR1 to the server 26 and to update the icon to indicate the changing intensities. Thus, moving the slider bar in one direction would cause a real-time increase in the intensity of the lighting load 12 covering the second zone and moving the slider bar in an opposite direction would cause a real-time decrease in the lighting load intensity. If a wall-mounted switch 18 for the lighting load 12 covering the second zone is turned off, the lighting daemon 42 would detect the resulting analog relay command ARC and multicast a message. The Virtual Light Switch 20 assigned to the second zone would update its icon to indicate that the lighting load 12 covering the second zone has been turned off.

Figure 4:
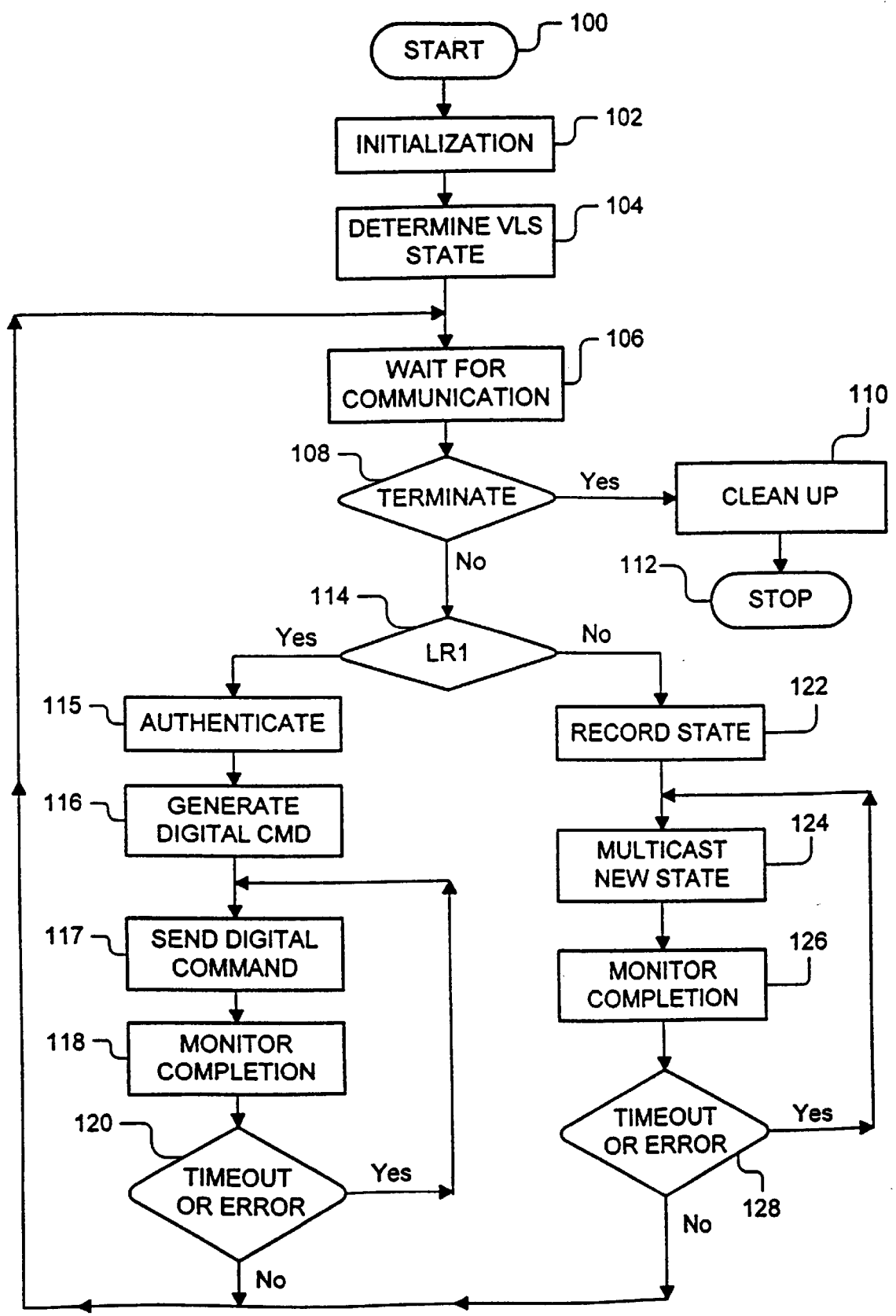
FIG. 4 is a flow control diagram of a lighting daemon, which is run on the server.

FIG. 4 shows the flow control for the lighting daemon 42. The lighting daemon 42 is run on the server 26 in the background. When started (block 100), the lighting daemon 42 performs initialization routines including logging onto the interface module 28 and establishing a connection with the interface module 28 (block 102).

After a connection with the interface module 28 has been established, the lighting daemon 42 can optionally read all of the current relay settings to determine the initial states of the lighting loads 12 (block 104). The initial states are recorded. The lighting daemon 42 can determine the relay settings by broadcasting queries on the power/communications bus 16 via the interface module 28 and then record the responses. Instead of determining the initial conditions of all of the lighting loads 12, the lighting daemon 12 could wait until a Virtual Light Switch 20 makes a connection with the server 26 and then determine and record the initial state of the connected Virtual Light Switch 20. In either scenario, the lighting daemon 42 would notify the Virtual Light Switch 20 of the initial lighting load state, thereby completing the connection.

Next, the lighting daemon 42 waits for communications from the network 24 and the interface module 28 (block 106). The lighting daemon 42 also waits for communications such as termination requests and first lighting control requests LR1 from the interface program 40.

If the lighting daemon 42 receives a termination request from a source such as the system operator (block 108), the lighting daemon 42 performs clean-up tasks (block 110) such as shutting down or terminating connections with the Virtual Light Switch 20 (e.g., making the Virtual Light Switch 20 unresponsive), flushing persistent internal states to the storage device 36 (e.g., closing open files), and logging off the interface module 28. Then the light daemon 42 terminates (block 112). The termination requests might be generated in order to perform maintenance such as daemon and system upgrades. The termination requests might also be generated internally in response to hardware and software faults.

If the lighting daemon 42 receives a first lighting control request LR1 (block 114), the lighting daemon 42 optionally performs authentication or some other security check (block 115), generates a digital command CMD (block 116) and sends the digital command CMD to the interface module 28 (block 117). The Virtual Light Switch 20 and the interface program 40 would typically use the same protocol for communicating with the lighting daemon 42. After the lighting daemon 42 sends the digital command CMD to the interface module 28 (block 117), it waits for an acknowledgment from the interface module 28 (block 118). If the acknowledgement is not received (block 120) due to, for instance, a timeout or transmission error, the lighting daemon 42 resends the digital command CMD to the interface module 28 (block 117). If an acknowledgment is received (block 120), the lighting daemon 42 resumes waiting for the next communication or message (block 106).

If the lighting daemon 42 receives an analog relay command ARC from the interface module 28 indicating a change in state of a lighting load (block 114), the lighting daemon 42 records the new state of the lighting load 12 (block 122). Then the lighting daemon 42 multicasts a message to the Virtual Light Switch 20 affected by the change in light state (block 124) and waits for an acknowledgment from the Virtual Light Switch (block 126). If the acknowledgement is not received (block 128) due to, for instance, a timeout or transmission error, the lighting daemon 42 resends the message to the Virtual Light Switch 20 (block 124). If an acknowledgment is received (block 128), the lighting daemon 42 resumes waiting for the next communication or message (block 106).

Functions such as waiting for and responding to first lighting control requests LR1 (blocks 106, 108 and 114 to 120), and monitoring and responding to changes in lighting load states (blocks 106, 108, 114 and 122 to 128) are shown as being performed sequentially. However, these functions could be performed in parallel by appropriate hardware such as a Symmetric Multiprocessor Machine (SMP). Thus, a lighting daemon 42 running on an SMP could monitor and respond to lighting load changes at the same time it waits for and responds to first lighting control requests LR1.

Figure 5:
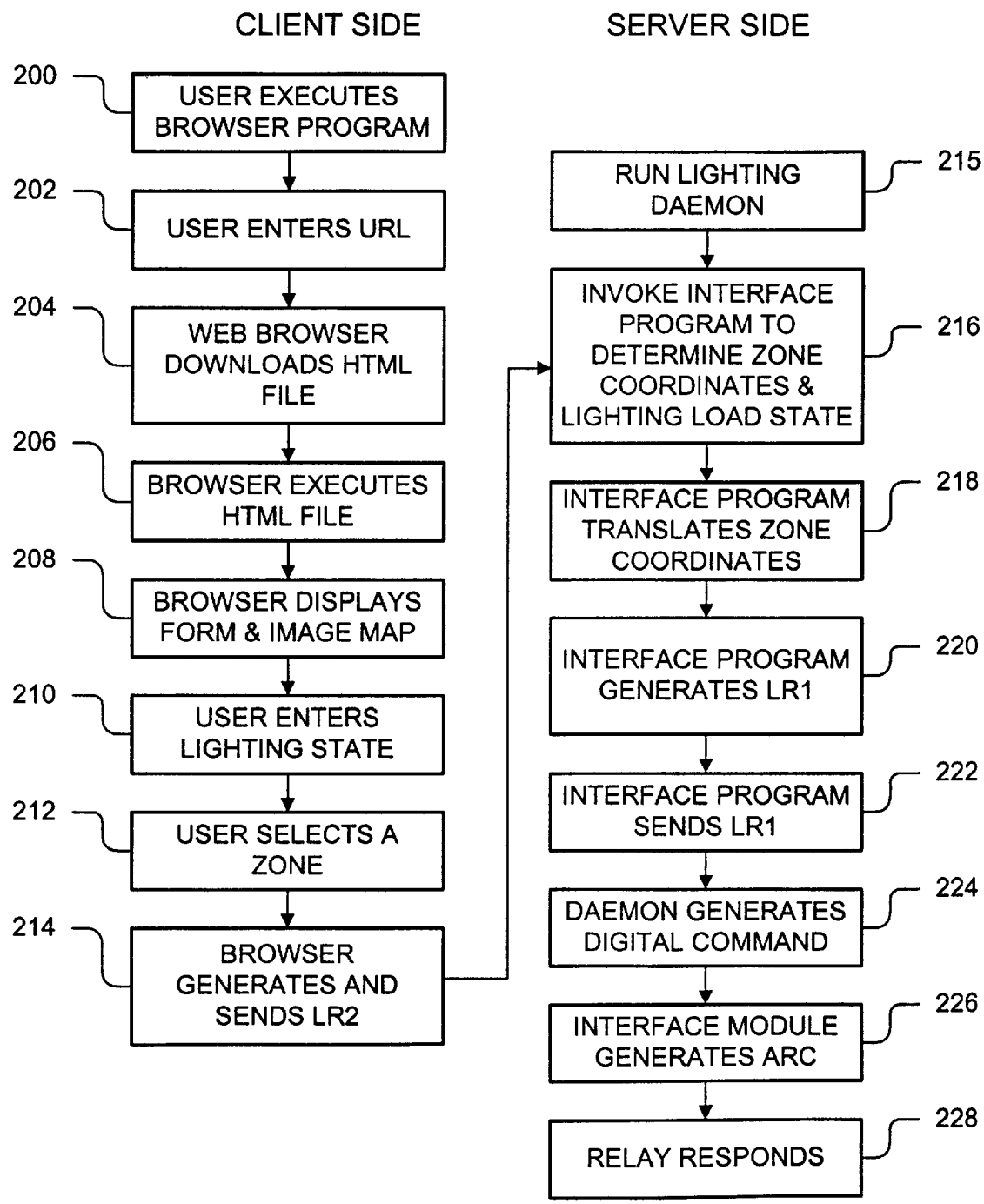
FIG. 5 is a flowchart of a method of controlling a lighting load using the server and the web browser.

FIG. 5 shows steps for controlling a lighting load 12 via the web browser 22. With the browser program 64 running on the first personal computer 48 (step 200), a user enters the URL of the HTML file 44 (step 202) corresponding to a floor plan. This causes the web browser 22 to download the HTML file 44 from the server 26 (step 204). The web browser 22 begins executing the HTML file 44 (step 206), generating and displaying the lighting control form 66 and downloading and displaying the image map 46 corresponding to the HTML file 44 (step 208). The user clicks a radio button indicating a light intensity (step 210) and then a zone 72 of the floor plan 70 (step 212). When the zone 72 is clicked on, the web browser 22 generates and sends a second lighting control request LR2 to the interface program 40 (step 214).

The interface program 42 is invoked to determine the zone coordinates and light state indicated by the second lighting control request LR2 (step 216) and translates the zone coordinates into a lighting load identifier (step 218). Then the interface program 40 generates a first lighting control request LR1 indicating the lighting load identifier and lighting load state (step 220), and sends the first lighting control request LR1 to the lighting daemon 42 (step 222), which is already running on the server 26 (step 215).

In response to the first lighting control request LR1, the lighting daemon 42 generates a digital command CMD for the interface module 28 (step 224). The interface module 28, in turn, generates an analog relay command ARC and multicasts the analog relay command ARC on the power/communications bus 16 (step 226). The analog relay command ARC is received by many of the relays 14, but only the relay for the lighting load covering the selected zone is controlled according to the requested lighting load state (step 228).

Figure 6:
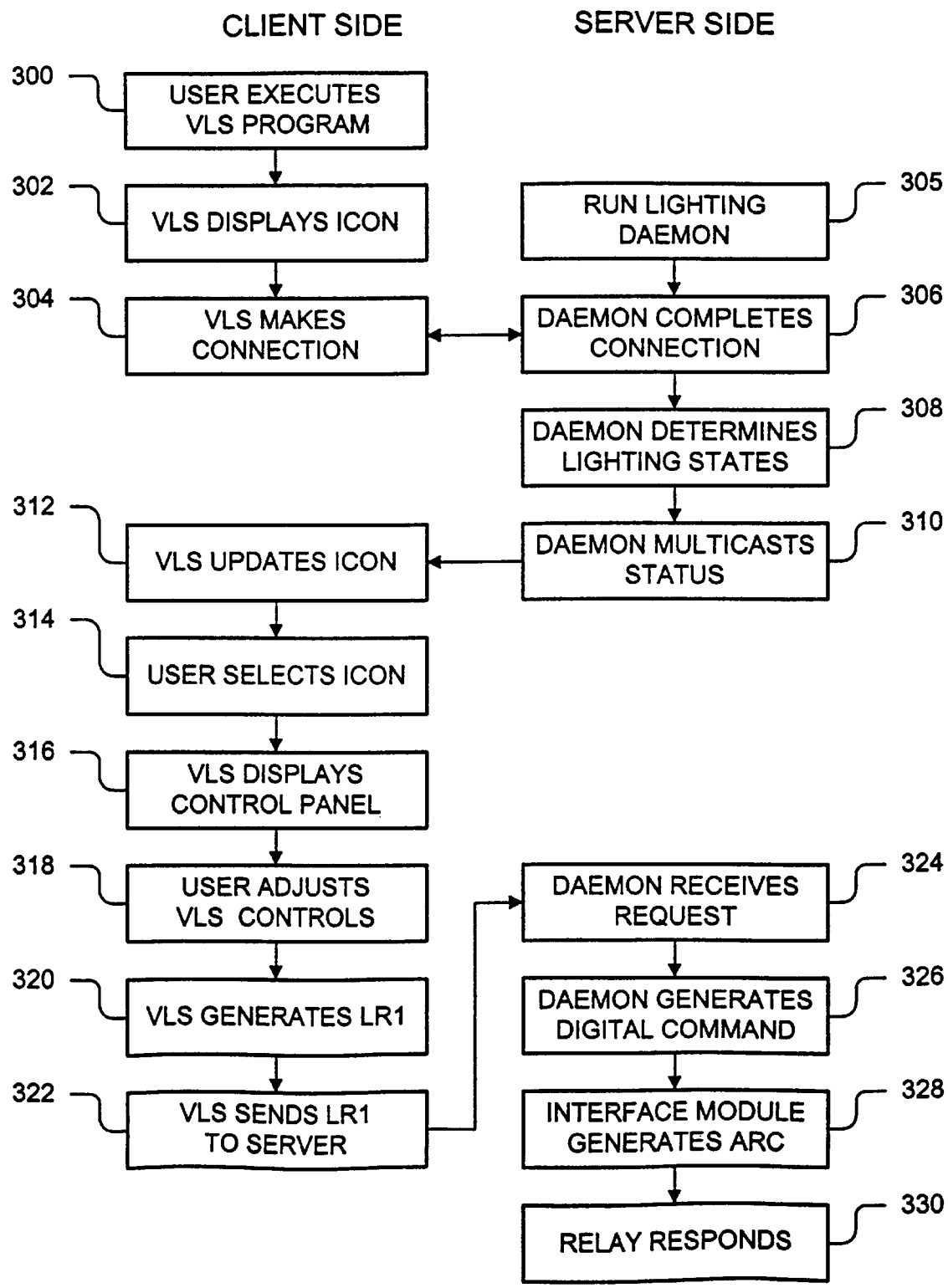
FIG. 6 is a flowchart of a method of controlling a lighting load using the server and the Virtual Light Switch.

FIG. 6 shows steps for controlling a lighting load 12 via a Virtual Light Switch 20. By way of example, the Virtual Light Switch 20 controls an overhead light 12. The VLS program 92 is executed on the second personal computer 76 (step 300). The Virtual Light Switch 20 displays the icon on the display 86 (step 302) and initiates a connection with the lighting daemon 42 (step 304), which is already running on the server 26 (step 306). The lighting daemon 42 determines the current state of the overhead light 12 (step 308), and multicasts a message indicating the current state on the computer network 24 (step 310). The Virtual Light Switch 20 for the overhead light 12 receives the message and updates the icon to indicate the current state of the overhead light 12 (step 312).

When the user selects the icon (step 314), the control panel 94 is shown on the display 86 (step 316). Each time the user moves a graphical control 96a or 96b on the control panel 94 (step 318), the Virtual Light Switch 20 generates a first lighting control request LR1 indicating the light identifier for the overhead lighting load and the light state for the overhead lighting load 12 (step 320). The first lighting control request LR1 is sent to the server 26 (step 322).

The lighting daemon 42 receives the first lighting control request LR1 (step 324) and generates a digital command CMD for the interface module 28 (step 326). The interface module 28, in turn, generates an analog relay command ARC for the power/communications bus 16 (step 328). The analog relay command ARC is received by many of the relays 14, but only the relay 14 for the overhead lighting load 12 is controlled (step 330).

Thus disclosed is a lighting control system 10 that allows lighting loads 12 to be controlled from the convenience of a computer. No longer is it necessary to walk over to a wall-mounted switch 18 or rely upon facilities management to control the lighting loads 12. Additionally, energy can be saved because the lighting control system 10 makes it easier to turn off the lighting loads and, therefore, makes it less likely that a person would leave the lighting loads on after leaving the office. Some people, especially those in a rush to leave the office, do not want to be burdened with the chore of turning off the lighting loads.

The lighting control system 10 makes use of existing infrastructure—computers and networks. Therefore, the lighting control system 10 can be implemented and expanded quickly and inexpensively.

The lighting control system 10 even allows the lighting loads 12 to be controlled outside of the facility, from a remote location. If a person can't remember whether the lights were left on in his office, he could dial into the computer network 24 using a modem or ISDN line on his home computer, download the appropriate HTML file 44 or run a VLS program 92 on his home computer, and turn off the lighting loads in his office.

The lighting control system 10 is applicable to any facility having centralized control of the lighting loads 12. For example, the lighting control system 10 could be applied to small businesses, schools and homes. Therefore, the lighting control system 10 is not limited only to office buildings.

The invention is not limited to the specific embodiments described above. For example, the lighting control form 66 can include graphical display elements for controlling lighting characteristics other than light intensity. If multiple lights cover a single zone, the lighting control form 66 can also include graphical display elements for controlling specific lights. For example, the lighting control form 66 might allow a selection of different colored lights (e.g. red and blue lights) or lights at different levels (e.g. upper and lower lights). Therefore, the selections on the lighting control form 66 ultimately depend upon the number and types of lights being controlled.

As another example, the image maps 46 are not limited to static image maps. Instead, dynamic image maps could show current lighting load states for each of the zones. A lighting state could be represented by showing a zone in a shade of gray or yellow. Additionally, the dynamic image maps could be updated for changes in lighting load states. Dynamic image mapping could be implemented via dynamic HTML, a CGI program and the lighting daemon 42.

Figure 7:
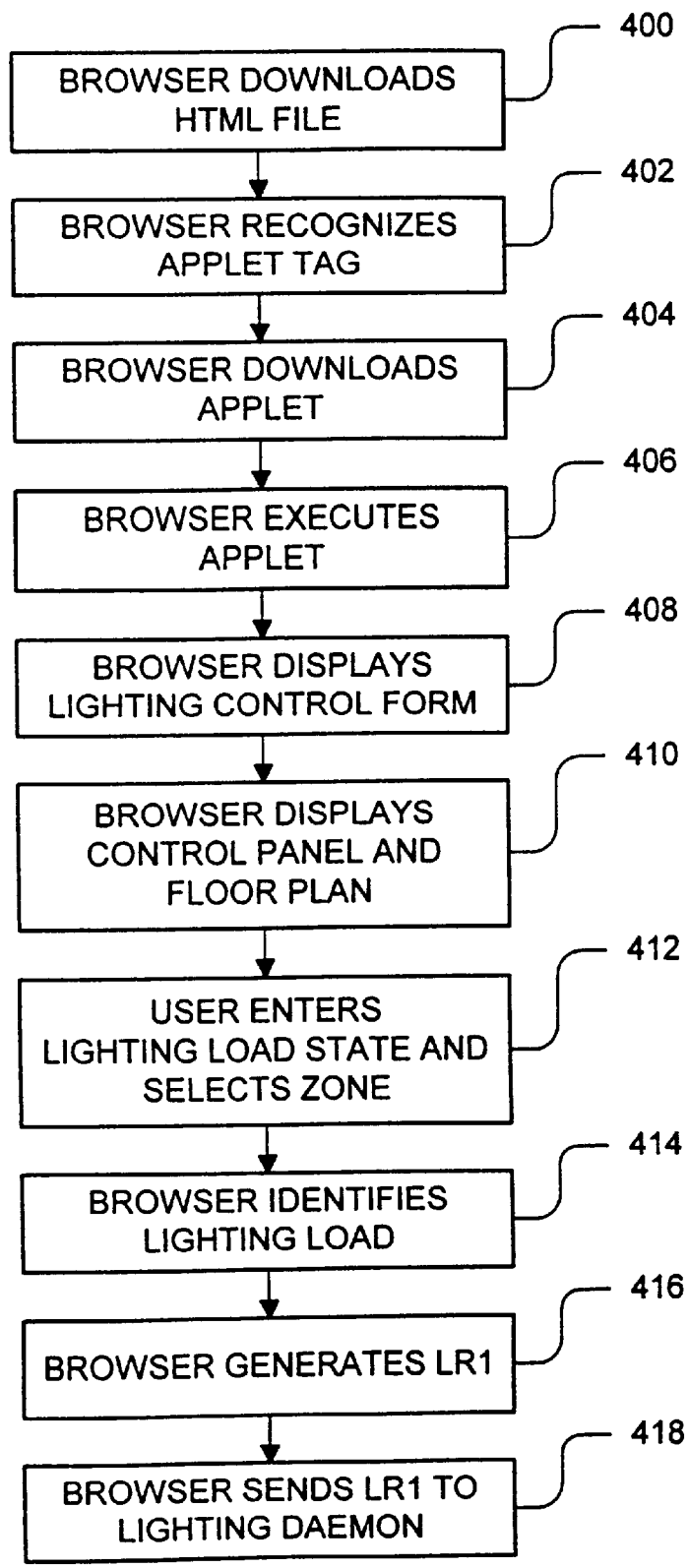
FIG. 7 is a flowchart of a method of controlling a lighting load using the server, a Java-enhanced web browser and an applet.

Yet another example is shown in FIG. 7. The HTML file 44 can utilize an applet 98 (see FIG. 1) for creating the image map 46 and displaying the lighting control form 66 instead of having the HTML file 44 create and display a lighting control form 66. The HTML file 44 includes an applet tag. A Java-enhanced web browser downloads the HTML file 44 (step 400), recognizes the applet tag (step 402), downloads the applet 98 (which is identified by the applet tag) (step 404) and begins executing the applet 98 (step 406). When executed, the applet 98 instructs the Java-enhanced web browser to display the lighting control form 66 (step 408) and download and display a pictograph of the floor plan (step 410). When a lighting load state is entered and a zone on the floor plan is selected (step 412), the applet 98 identifies the lighting load covering the selected zone (step 414), generates a first (not second) lighting request LR1 indicating the identified lighting load and the light state (step 416), and sends the first lighting control request LR1 directly to the lighting daemon 42 (step 418). Thus, the applet 98 bypasses the interface program 40. Moreover, the applet 98 allows a greater selection of controls (e.g., sliders and scrollbars) for entering the intensity and other characteristics of the lighting loads 12. A web browser that is not Java-enhanced would simply ignore the applet tag and, instead, download an image map 46 and create and display a lighting control form 66 as instructed by the other tags in the HTML file 44.

Instead of utilizing an applet 98, the HTML file could utilize JavaScript scripting or Active-X controls. A web browser that is not JavaScript scripting or Active-X enabled would simply display a lighting control form 66.

Instead of using CGI scripting for the interface program 40 program, the interface program 40 could be implemented by programs written in a native language such as C++. Moreover, the interface program 40 is not limited to a CGI program. Rather, the interface program 40, if used, could be any program that allows the server (or another computer) to translate the zone coordinates into lighting load identifiers.

The invention is not limited to an image map 46 of a floor plan. Rather, the invention can use any pictograph that allows lighting loads 12 to be identified and selected.

The lighting daemon 42 could be run on the same server 26 as the interface program 40 or it could be on a different server. If the lighting daemon 42 is run on a different server, the interface program 42 would relay the first lighting control request LR1 to the server on which the lighting daemon 42 is running.

The lighting daemon 42 can retrieve the first lighting control requests LR1 by means other than by listening to ports. For example, the lighting daemon 42 could receive tokens.

The lighting daemon 42 is not restricted to run on any particular operating system. Although the term "daemon" is associated with the Unix paradigm, the lighting daemon 42 is a lighting control program that can be adapted for any operating system. In the Novell paradigm, the lighting daemon 42 might be referred to as a lighting "network loadable module" or "NLM."

The Network Appliances are not limited to Virtual Light Switches 20 and web browsers 22 based on personal computers. Network Appliances found around the home could include personal digital assistants (PDAs), cellular telephones, calculators and information appliances such as smart toasters.

Figure 8:
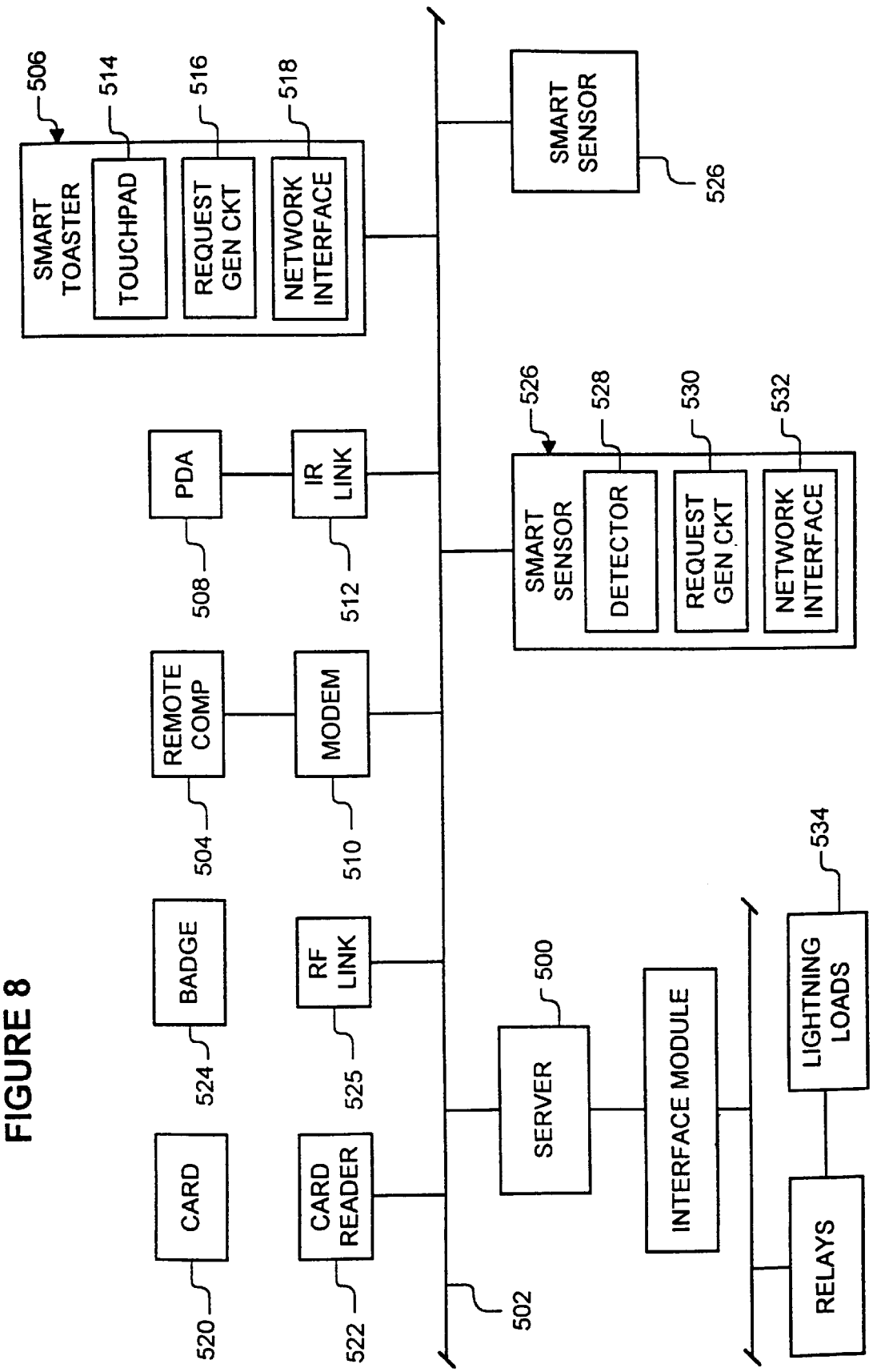
FIG. 8 is a block diagram of a lighting control system including a server and different Network Appliances connected to an Ethernet backbone.

FIG. 8 shows a server 500 and a number of different Network Appliances connected to an Ethernet backbone 502. The Network Appliances include a remote computer 504 connected to the Ethernet backbone 502, a smart toaster 506 and a personal digital assistant ("PDA") 508. The remote computer 504 can send lighting control requests LR1 and LR2 to the server 500 via a modem 510, and the PDA 508 can send lighting control requests LR1 and LR2 to the server 500 via an IR link 512.

In fact, the server 500 could receive lighting control requests LR1 and LR2 from any device that can speak a computer network protocol and that can be connected to the backbone 502. Any device including a means 514 (e.g., a touchpad, a voice-responsive control) for accepting a manual input, a circuit 516 for generating first lighting control requests LR1 in response to the manual input; and means 518 including an inexpensive Ethernet chip for communicating over the computer network could function as a Virtual Light Switch. Such is the case with the smart toaster 506.

Moreover, manual inputs for the Virtual Light Switch are not required. Certain Network Appliances could be programmed to automatically generate first lighting control requests LR1. For example, an intelligent chip card 520 has an embedded Java Virtual Machine. When read by a card reader 522, the chip card 520 instructs the card reader 522 to send a first lighting control request LR1 to the server 500. The chip card 520 and card reader 522 could request the server 500 to turn on office lights when a person enters the office building in the morning. The server 500 could even turn on air conditioning. As another example, a badge 524 including a transponder and appropriate logic could send out first lighting control requests LR1 to an RF link 525, which is connected to the server 500 via the backbone 502.

Smart sensors 526 could also be programmed to generate first lighting control requests LR1. Such a smart sensor 526 includes a transducer 528 (e.g., a motion detector, a weight detector, a heat detector, an acoustic detector); a circuit 530 for generating a first lighting control request LR1 when a detection is made; and a means 530 including the Ethernet chip for placing the first lighting control request LR1 on the backbone 502. For example, an office could include a lighting load 534 and a smart sensor 526 assigned to the lighting load 534. When a person enters the office, the smart sensor 526 automatically senses the presence of the person, generates a first lighting control request LR1, and sends the first lighting control request LR1 to the server 502. The office lights are turned on automatically.

Connecting the smart sensors 526 to an existing computer network could be much easier than hard-wiring standard lighting control sensors to a power/communications bus, especially where the infrastructure is already available.

It should be noted that the smart sensors 526 and Network appliances such as the smart toaster 506 are not microprocessor-based. Instead, they include dedicated circuits 516 and 530 for generating the first lighting control requests LR1.

Although the specific embodiments of the invention have been described and illustrated, the invention is not limited to the specific forms or arrangements of parts so described and illustrated. The invention is limited only by the claims that follow.

What is claimed is:

1. A lighting control system for at least one lighting load, the system comprising:
    a computer network;
    a server including memory encoded with executable instructions, the instructions, when executed, instructing the server to receive lighting control requests on the computer network and respond to the lighting control requests by generating lighting control commands, the lighting control requests indicating lighting load states; and
    means for controlling power to at least one lighting load in response to the lighting control commands.

2. The system of claim 1, wherein the controlling means is responsive to digital commands having a proprietary format, and wherein the server is instructed to generate the lighting control commands in the proprietary format.

3. The system of claim 1, wherein the controlling means includes an interface module responsive to the lighting control commands; a power/communications bus connected to an output of the interface module; and a plurality of relays connected to the power/communications bus.

4. The system of claim 1, wherein at least some of the lighting control requests directly identify the lighting load, and wherein the lighting control commands directly identify the lighting load.

5. The system of claim 1, wherein multiple lighting loads are controllable, wherein at least some of the lighting control requests indirectly identify the lighting loads; wherein the instructions, when executed, further instruct the server to process the lighting control requests to directly identify the lighting loads, and wherein the lighting control commands also directly identify the lighting loads.

6. The system of claim 1, wherein the plurality of instructions includes a lighting control program, and wherein the lighting control program instructs the server to listen for the lighting control requests on the computer network and generate the lighting control commands.

7. The system of claim 6, further comprising a communications bus; and means for generating status messages relating to at least one lighting load and placing the messages on the communications bus; wherein the lighting control program further instructs the server to monitor the status messages on the bus and broadcast contents of the messages on the computer network.

8. The system of claim 6, wherein the plurality of instructions, when executed, instruct the server to assign a Virtual Light Switch to a lighting load.

9. The system of claim 1, wherein the plurality of instructions includes an interface program and a lighting control program, wherein the interface program instructs the server to listen for the lighting control requests on the computer network and generate first lighting control requests, and wherein the lighting control program instructs the server to generate the lighting control commands in response to the first lighting control requests.

10. The system of claim 1, wherein the memory is further encoded with at least one image map and a second plurality of instructions for instructing a web browser to download and display the image map and to display a form for entering a lighting load state, the second plurality of instructions further instructing the web browser to generate a lighting control request and send the lighting control request over the network when a zone of the image map is selected.

11. The system of claim 10, wherein the image map represents a clickable floor plan, at least one lighting load corresponding to a zone on the floor plan.

12. The system of claim 10, wherein the second plurality of instructions is included in an HTML file, whereby an HTML file is downloaded by a web browser.

13. The system of claim 1, wherein the memory is further encoded with an image, an applet and an HTML file, the HTML file instructing a web browser to execute the applet, the applet, when executed, displaying the image and a control panel, the image including selectable representations, the control panel allowing a lighting load state to be entered, the applet instructing the web browser to generate the lighting control request and send the lighting control request when a light state is entered.

14. The system of claim 1, wherein the plurality of instructions further instructs the server to perform authentication on the lighting control requests.

15. The system of claim 1, further comprising at least one Network Appliance for placing the lighting control requests on the computer network.

16. The system of claim 15, wherein at least one Network Appliance includes a Virtual Light Switch.

17. The system of claim 15, wherein at least one Network Appliance includes a web browser.

18. The system of claim 15, wherein the at least one Network Appliance includes a plurality of smart sensors that are connected to the computer network, the smart sensors being operable to generate the lighting control requests.

19. The system of claim 18, wherein at least one smart sensor includes a detector; a circuit for generating a first lighting control request when a detection is made by the detector; and a network interface circuit connected to the network.

20. The system of claim 15, wherein at least one Network Appliance includes a manual input device; a circuit for generating a first lighting control request in response to the manual input device; and a network interface circuit connected to the network.

21. A lighting control system for controlling multiple lighting loads, the system comprising:
    a computer network;
    a server including memory encoded with executable instructions, the instructions, when executed, instructing the server to receive lighting control requests on the computer network and respond to the lighting control requests by generating digital commands, each lighting control request identifying a lighting load and indicating a lighting load state, the digital commands directly identifying the lighting load and indicating the lighting load state;
    a power/communications bus;
    an interface module, responsive to proprietary digital commands, for generating analog relay requests and placing the analog relay requests on the power/communications bus; and
    a plurality of relays connected to the power communications bus, the relays controlling power and communications to the lighting loads in response to the analog relay commands.

22. The system of claim 21, wherein the plurality of instructions includes a lighting control program, and wherein the lighting control program instructs the server to listen for the lighting control requests on the computer network and generate the lighting control commands.

23. The system of claim 21, wherein the plurality of instructions includes an interface program and a lighting control program, wherein the interface program instructs the server to listen for the lighting control requests on the computer network and generate first lighting control requests, and wherein the lighting control program instructs the server to generate the lighting control commands in response to the first lighting control requests.

24. The system of claim 21, wherein the memory is further encoded with at least one image map and a second plurality of instructions for instructing a web browser to download and display the image map and to display a form for entering a lighting load state, the second plurality of instructions further instructing the web browser to generate a lighting control request and send the lighting control request over the network when a zone of the image map is selected.

25. The system of claim 24, wherein the image map represents a clickable floor plan, at least one lighting load corresponding to a zone on the floor plan.

26. The system of claim 24, wherein the second plurality of instructions is included in an HTML file.

27. The system of claim 21, wherein the plurality of instructions further instructs the server to perform authentication on the lighting control requests.

28. The system of claim 21, further comprising a plurality of smart sensors connected to the computer network, the smart sensors being operable to generate lighting control requests.

29. A server connected between a computer network and an interface module for a lighting control system, the server comprising:

a central processing unit; and computer memory encoded with a lighting control program, the lighting control program, when running on the server, instructing the central processing unit to listen for lighting control requests on the computer network, generate digital commands in response to the lighting control requests, and send the digital commands to the interface module;

each lighting control request identifying a lighting load and indicating a lighting load state;

each digital command directly identifying the lighting load and indicating the lighting load state.

30. The server of claim 29, wherein the computer memory is further encoded with an interface program that, when running, instructs the server to process lighting control requests that indirectly identify lighting loads and generate first lighting control requests directly identifying the lighting loads, and wherein the lighting control program instructs the server to generate the lighting control commands in response to the first lighting control requests.

31. The server of claim 29, wherein the memory is further encoded with at least one image map and an HTML file, the HTML file instructing a web browser to download and display the image map and to display a form for entering a lighting load state, the HTML file further instructing the web browser to generate a lighting control request and send the lighting control request over the network when a zone of the image map is selected.

32. The server of claim 29, wherein the image map represents a clickable floor plan, and wherein zones on the floor plan correspond to lighting loads.

33. The server of claim 29, wherein the memory is further encoded with a plurality of executable instructions that, when executed, instruct the server to perform authentication on the lighting control requests.

34. An article of manufacture for a server connected between a computer network and an interface module of a lighting control system, the article comprising:

computer memory; and a plurality of executable instructions encoded in the computer memory, the instructions, when executed, causing the server to listen for lighting control requests on the computer network; generate proprietary digital commands in response to the lighting control requests; and send the digital commands to the interface module; each lighting control request identifying a lighting load and indicating a lighting load state, each digital command directly identifying the lighting load and indicating the lighting load state.

35. The article of claim 34, wherein the computer memory is further encoded with a second plurality of instructions that, when executed, instruct the server to translate lighting control requests that indirectly identify lighting loads into first lighting control requests that directly identify lighting loads, and wherein the first lighting control requests are processed into the digital commands.

36. The article of claim 34, wherein the memory is further encoded with at least one image map and an HTML file, the HTML file instructing a web browser to download and display the image map and to display a form for entering a lighting load state, the HTML file further instructing the web browser to generate a lighting control request and send the lighting control request over the network when a zone of the image map is selected.

* * * * *